(12) United States Patent
Dyson et al.

(10) Patent No.: US 11,603,764 B2
(45) Date of Patent: Mar. 14, 2023

(54) ADDITIVE SUPPORTS WITH INTEGRAL FILM COOLING

(71) Applicant: GENERAL ELECTRIC COMPANY, Schenectady, NY (US)

(72) Inventors: Thomas Earl Dyson, Niskayuna, NY (US); Joseph I Block, Greenville, SC (US); Brendon James Leary, Greenville, SC (US); Lyndsay Marie Kibler, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/270,261

(22) PCT Filed: Aug. 31, 2018

(86) PCT No.: PCT/US2018/049274
§ 371 (c)(1),
(2) Date: Feb. 22, 2021

(87) PCT Pub. No.: WO2020/046396
PCT Pub. Date: Mar. 5, 2020

(65) Prior Publication Data
US 2021/0254475 A1 Aug. 19, 2021

(51) Int. Cl.
*F01D 5/18* (2006.01)
(52) U.S. Cl.
CPC .......... *F01D 5/186* (2013.01); *F05D 2220/32* (2013.01); *F05D 2230/10* (2013.01);
(Continued)

(58) Field of Classification Search
CPC .............. F01D 5/186; F05D 2260/202; F05D 2230/40; F05D 2230/90
See application file for complete search history.

(56) References Cited

U.S. PATENT DOCUMENTS 4,743,462 A * 5/1988 Radzavich ................ C23C 4/01
427/300
5,039,562 A 8/1991 Liang
(Continued)

FOREIGN PATENT DOCUMENTS

EP 2937513 A2 10/2015
EP 3112755 A1 1/2017
(Continued)

OTHER PUBLICATIONS

International Preliminary Report on Patentability for corresponding PCT Application No. PCT/US2018/049274 dated Mar. 11, 2021, 7 pages.
(Continued)

*Primary Examiner* — Eldon T Brockman
(74) *Attorney, Agent, or Firm* — James Pemrick; Charlotte Wilson; Hoffman Warnick LLC

(57) ABSTRACT

An article of manufacture includes an article body portion (36); at least one pedestal (58A, 60A, 84, 86) integrally formed with the article body portion (36), and disposed at an outer periphery of (52), and structurally coupled to the article body portion (36); and at least one internal feature (72) disposed at least partially within the article body portion (36) and at least partially within the pedestal (58A, 60A, 84, 86). At least a portion of the internal feature (72) is hollow.

17 Claims, 8 Drawing Sheets

(52) U.S. Cl.
CPC ...... *F05D 2230/40* (2013.01); *F05D 2230/90* (2013.01); *F05D 2260/202* (2013.01)

(56) References Cited

U.S. PATENT DOCUMENTS

| | | | |
|---|---|---|---|
| 7,147,899 B2* | 12/2006 | Fernihough | C23C 16/042 427/508 |
| 8,475,121 B1 | 7/2013 | Liang | |
| 10,337,737 B2* | 7/2019 | Holdcraft | F23R 3/007 |
| 2005/0191422 A1* | 9/2005 | Fernihough | C23C 16/042 427/282 |
| 2014/0102684 A1 | 4/2014 | Sezer et al. | |
| 2016/0177733 A1* | 6/2016 | Lewis | F01D 5/147 29/889.721 |
| 2018/0230831 A1 | 8/2018 | Kush et al. | |

FOREIGN PATENT DOCUMENTS

| | | |
|---|---|---|
| JP | 2006183529 A | 7/2006 |
| JP | 2014080973 A | 5/2014 |
| WO | WO-2019141755 A1 * | 7/2019 |

OTHER PUBLICATIONS

JP Office Action for corresponding JP Application No. 2021-507495, dated Jul. 6, 2022, 14 pages.
Written Opinion and International Search Reported dated Jun. 7, 2019 for PCT/US201/049274 filed Aug. 31, 2018; pp. 8.

* cited by examiner

ADDITIVE SUPPORTS WITH INTEGRAL FILM COOLING

BACKGROUND

The present embodiments relate to turbine airfoils and more specifically to methods of manufacturing turbine airfoils and other components.

Components manufactured for high temperature applications such as hot gas path components of gas turbine engines, often use various cooling and thermal management techniques to ensure the components do not melt, exceed operating temperatures and/or experience excessive thermal gradients during use. These hot gas path components may include turbine airfoils, turbine nozzles or vanes, turbine shrouds, struts, flow path inner bands, flow path outer bands and other components. Several cooling techniques that are often employed to cool such components include film cooling, turbulation, impingement cooling, as well as using coatings such as thermal barrier coatings (TBC) to insulate the components from high flow path temperatures.

Additive manufacturing may be used to form components used in high temperature applications. Support structures are often used during additive manufacturing to ensure components are structurally supported while they are being built. Placement of supports on the high temperature components in the vicinity of cooling features requires additional machining steps due to cooling holes or features being damaged by the support structure or during the removal of the support structure. Film cooling holes may also suffer performance loss due to coating in-fill and/or changes from nominal shape during "cleaning" operations.

BRIEF DESCRIPTION

In accordance with another aspect of the present embodiments, an article of manufacture includes an article body portion (36); at least one pedestal (58A, 60A, 84, 86) integrally formed with the article body portion (36), and disposed at an outer periphery of (52), and structurally coupled to the article body portion (36); and at least one internal feature (72) disposed at least partially within the article body portion (36) and at least partially within the pedestal (58A, 60A, 84, 86). At least a portion of the internal feature (72) is hollow.

In accordance with another aspect of the present embodiments, an airfoil includes: an airfoil body (36) extending from a leading edge (44) to a trailing edge (46), from a pressure side (50) to a suction side (52), and from a root portion (48) to a tip portion (42); at least one internal cavity (54) disposed within the airfoil body (36); at least one pedestal (58A, 60A, 84, 86) integrally formed with the airfoil body (36) and protruding from an outer periphery (52) of the airfoil body (36), the at least one pedestal (58A, 60A, 84, 86) structurally coupled to the airfoil body (36); and at least one film cooling hole (72) disposed at least partially within the airfoil body (36) and at least partially within the pedestal (58A, 60A, 84, 86). The film cooling hole (72) is in fluid communication with the at least one internal cavity (54).

In accordance with another aspect of the present embodiments, a method of forming a component includes: selecting (1002) a component (36) orientation for the component (36) being formed such that one or more structure (58A, 60A, 84, 86) aligns with at least one feature (72) of the component (36); forming (1004) the component (72) and structure (58A, 60A, 84, 86) with the structure (58A, 60A, 84, 86) disposed on the feature (72); coating (1010) the component (72) and structure (58A, 60A, 84, 86); and blending (1012) at least one surface of the component (72) with at least one surface of the structure (58A, 60A, 84, 86). The at least one feature (72) is disposed at least partially in the component (36) and at least partially in the structure (58A, 60A, 84, 86).

DRAWINGS

These and other features, aspects, and advantages of the present embodiments will become better understood when the following detailed description is read with reference to the accompanying drawings in which like characters represent like parts throughout the drawings, wherein.

Figure 1:
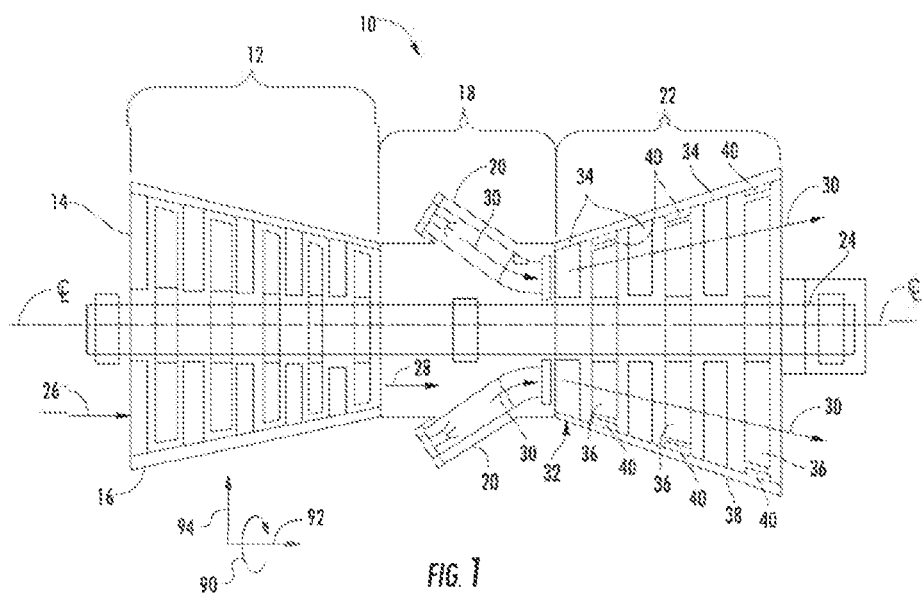
FIG. 1 is a schematic representation of a gas turbine engine in an industrial application.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "axial" refers to a direction aligned with a central axis or shaft of the gas turbine engine or alternatively the central axis of a propulsion engine and/or internal combustion engine. An axially forward end of the gas turbine engine is the end proximate the fan and/or compressor inlet where air enters the gas turbine engine. An axially aft end of the gas turbine engine is the end of the gas turbine proximate the engine exhaust where low pressure combustion gases exit the engine via the low pressure (LP) turbine. In non-turbine engines, axially aft is toward the exhaust and axially forward is toward the inlet.

As used herein, the term "circumferential" refers to a direction or directions around (and tangential to) the circumference of an annulus of a combustor, or for example the circle defined by the swept area of the turbine blades. As used herein, the terms "circumferential" and "tangential" are synonymous.

As used herein, the term "radial" refers to a direction moving outwardly away from the central axis of the gas turbine, or alternatively the central axis of a propulsion engine. A "radially inward" direction is aligned toward the central axis moving toward decreasing radii. A "radially outward" direction is aligned away from the central axis moving toward increasing radii.

As used herein, the term "modality" refers to any additive manufacturing build methods and processing including but not limited to binder jetting, directed energy deposition, material extrusion, selective laser melting (SLM), material jetting, powder bed fusion, sheet lamination, welding, brazing, vat photopolymerization, stereolithography (SLA), direct metal laser melting (DMLM), fused deposition modeling (FDM), direct metal laser sintering (DMLS), and electron beam melting (EBM). There are also additive modalities that do not utilize powder. Additive manufacturing is also referred to as a generative build process.

As used herein, the term "powder" may to various materials including but not limited to metallic, ceramic and polymer powders. Powder characteristics such as size, material, density and other properties may depend on the modality being employed.

As used herein, the terms "de-powder" and "powder removal" refer to the process of removing excess powder from a part following or during the build phase.

Referring now to the drawings, wherein like numerals refer to like components, FIG. 1 illustrates an example of a gas turbine 10 which may incorporate various aspects of the present embodiments. As shown, the gas turbine 10 generally includes a compressor section 12 having an inlet 14 disposed at an upstream end of the gas turbine 10, and a casing 16 that at least partially surrounds the compressor section 12. The gas turbine 10 further includes a combustion section 18 having at least one combustor 20 downstream from the compressor section 12, and a turbine section 22 downstream from the combustion section 18. As shown, the combustion section 18 may include a plurality of the combustors 20. A shaft 24 extends axially through the gas turbine 10. FIG. 1 illustrates the radial 94, axial 92 and circumferential directions 90.

In operation, air 26 is drawn into the inlet 14 of the compressor section 12 and is progressively compressed to provide compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 across a first stage 32 of turbine nozzles 34 and into the turbine section 22. The turbine section generally includes one or more rows of rotor blades 36 axially separated by an adjacent row of the turbine nozzles 34. The rotor blades 36 are coupled to the rotor shaft 24 via a rotor disk. The rotor shaft 24 rotates about an engine centerline CL. A turbine casing 38 at least partially encases the rotor blades 36 and the turbine nozzles 34. Each or some of the rows of rotor blades 36 may be concentrically surrounded by a shroud block assembly 40 that is disposed within the turbine casing 38. The hot gas 30 expands as it flows through the turbine section 22. Thermal and/or kinetic energy is transferred from the hot gas 30 to each stage of the rotor blades 36, thereby causing the shaft 24 to rotate and produce mechanical work. The shaft 24 may be coupled to a load such as a generator (not shown) so as to produce electricity. In addition, or in the alternative, the shaft 24 may be used to drive the compressor section 12 of the gas turbine.

Figure 2:
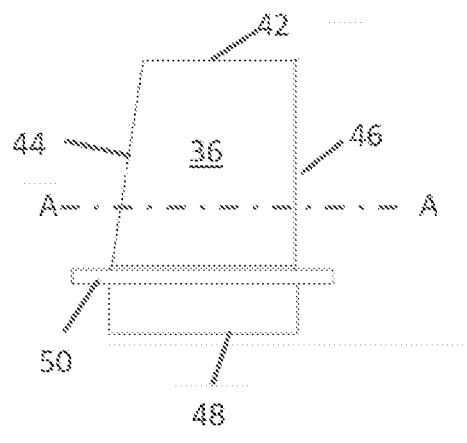
FIG. 2 is a side view of a turbine airfoil.

FIG. 2 provides an enlarged cross section side view of an exemplary turbine rotor blade or airfoil 36, which extends from an axially forward leading edge 44 to an axially aft trailing edge 46 and from a radially inward root 48 to a radially outer tip 42. The airfoil 36 includes a platform 50 defining a radially inner boundary of a hot gas path.

Airfoils composed of superalloy materials such as nickel-based superalloys and other metallic superalloys may be formed using investment casting, additive manufacturing and other techniques, which produces the desired material properties for operation within a turbine section 22 of a gas turbine engine 10. However, even with superalloy materials, turbine airfoils often still need to be cooled. Internal air-cooled passageways are often formed with airfoils to provide sufficient cooling to the airfoil. For example, internal cooling channels and flow circuits of an airfoil 36 may be formed using investment casting, additive manufacturing and/or via machining processes such as electrical discharge machining (EDM).

Figure 3:
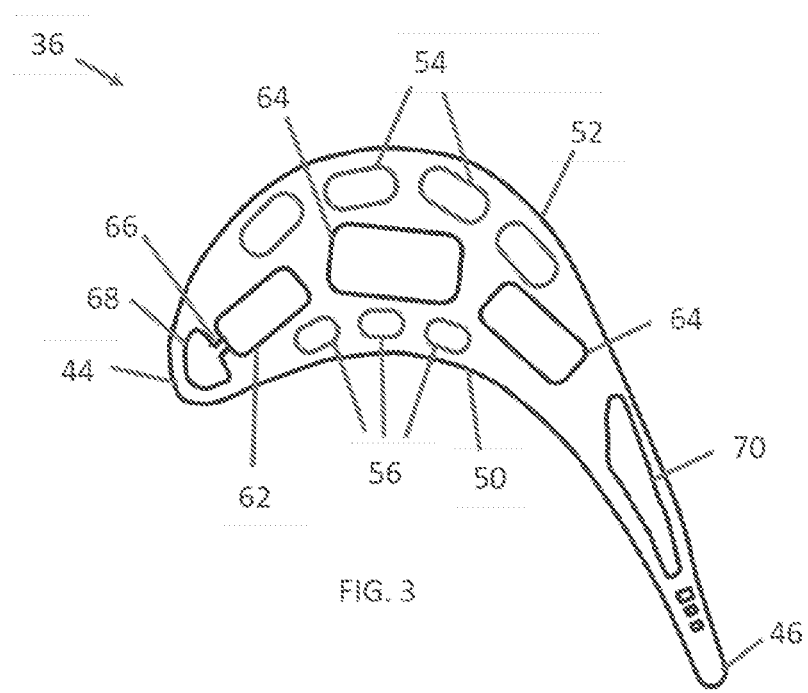
FIG. 3 is top radially inward-looking view of a turbine airfoil.

FIG. 3 illustrates a top (radially inward looking) view of a cross-section of airfoil 36 taken along line A-A shown in FIG. 2. The airfoil extends from a leading edge 44 to a trailing edge 46 and from a pressures side 50 to a suction side 52 and may include at least one central cavity 64 extending radially through the airfoil body portion 37. A leading edge feed cavity 62 extends radially through the airfoil 36 and receives cooling air from the airfoil root portion 48 (not shown). Cooling air travels through at least one cross-over hole 66 from the leading edge feed cavity 62 into a leading edge shower head 68 which distributes cooling air to the exterior of the airfoil 36 at the leading edge 44 via a plurality of cooling passages (not shown). The airfoil 36 also includes at least one trailing edge feed cavity 70. The airfoil may also include a plurality of large perimeter radial cooling passages 54 aligned along the suction side 52 of the airfoil 36, as well as a plurality of smaller perimeter radial cooling passages 56 aligned along the suction side 52 of the airfoil 36. The airfoil may also include other numbers of cooling passages and arrangements including cooling passages with cross sections of different shapes and aligned in different orientations including axially and circumferentially. The airfoil 36 may also include other airfoil cooling, thermal management and/or structural architectures than those shown in FIG. 3. Film cooling holes (not shown) are often placed around the outer periphery of the airfoil. For example, film cooling holes (not shown) are often placed along the leading edge, the trailing edge, the suction side and the pressure side. Cooling air flows through film cooling holes (not shown) from one or more internal airfoil passages 54, 56, 62, 64, 66, 68, 70 to the exterior of the airfoil 36.

Figure 4:
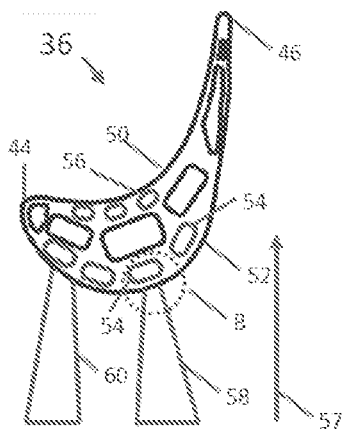
FIG. 4 is a radially-inward looking cross-section view of an airfoil being printed via additive manufacturing.

FIG. 4 illustrates a radially-inward looking cross-section view of an airfoil 36 being printed via additive manufacturing. The airfoil 36 extends from a leading edge 44 to a trailing edge 46, and from a pressure side 50 to a suction side 52. Also included in FIG. 4 are a plurality of large cooling passages 54 spaced along the airfoil suction side 52, as well as a plurality of smaller cooling passages 56 spaced along the airfoil pressure side 50. During the build process, a first support structure 58 and a second support structure 60 may be used to support the airfoil 36. The first and second support structures 58, 60 are mechanically coupled to the suction side 52 of the airfoil 36. In other arrangements of the present embodiments, other configurations and numbers of support structures may be used. For example, a third, fourth, fifth and even other numbers of support structures may be present in between the first and second support structures 58, 60, to the right of the first support structure 58 and/or to the left of the second support structure 60. In addition, the build processes of the present embodiments may include building with the airfoil 36 in other orientations. For example, instead of structurally connecting to the airfoil suction side 52, the first and second support structures 58, 60 may connect to a pressure side 50, the trailing edge 46, the leading edge 44, other portions of the suction side 52 closer to the leading or trailing edges 44, 46 and/or other portions of the pressure side closer to the leading and/or trailing edges 44, 46. The support structures 58, 60 may be located at the bottom or beneath the airfoil 36 during the build process. Stated otherwise, the support structures 58, 60 will be located below the portion of the airfoil 36 that is being built first.

Referring still to FIG. 4, a build direction 57 is illustrated in FIG. 4 indicating that during the build process, in the embodiment shown in FIG. 4, for example, the support structures 58, 60 are formed first, then the portions of the airfoil 36 on the suction side 52 adjacent the support structures 58, 60, then the body of the airfoil, and finally the trailing edge portion 46. Different portions of the airfoil 36 will be built first, second, third, last, etc. with build processes that use different airfoil orientations. In addition, the airfoil may be rotated such that a radially inner or outer portion and airfoil is built first or last (i.e., building from airfoil root 48 to tip 42 or from airfoil tip 42 to root 48). The portions of the airfoil suction side 52 that are in contact with the support structures 58, 60 may include cooling features such as film holes and other types of cooling holes.

Still referring to FIG. 4, the additive build process may be defined such that first and second support structures 58, 60, as well as other support structures (as discussed above) that are used, are placed so as to avoid shallow overhangs. The additive modality, build material, and part geometry that are used may define an overhang angle that is achievable, without risking the airfoil 36 or other part being built via an additive process (such as turbine nozzles, vanes, fuel nozzles, and other parts and gas turbine components) from becoming distorted and/or fracturing. For example, with some additive modalities, overhang angles of 60° (i.e., from a horizontal plane) and higher are achievable. With other additive modalities, overhang angles of 45° and higher may be achievable. With other additive modalities, overhang angles of 40° and higher may be achievable. With other additive modalities, overhang angles of 35° and higher may be achievable. With other additive modalities, overhang angles of 30° and higher may be achievable. With other additive modalities, overhang angles of 20° and higher may be achievable. Portions of parts that exceed the allowable overhang as defined by the part geometry, modality and build material will likely require one or more support structures (for example, support structures 58, 60) during the build process. In the embodiment of FIG. 4, portions close to the trailing edge 46 at angles above 60° may not require support structures, while less steep portions at the leading edge 44 and mid-chord on the suction side 54 may require support structures.

Referring still to FIG. 4, the support structures 58, 60 may be partially hollow and/or solid. For example, the support structures 58, 60 may be solid in the portions adjacent to and/or abutting the airfoil 36, to encapsulate and/or seal off any internal features, cooling holes, and/or flow conditioning structures on the outer surface of the airfoil 36. In other portions, for example closer to the bottom where the support structures 58, 60 may contact and/or rest on a build platform (not shown), the support structures 58, 60 may be at least partially hollow in order to reduce the amount of required build material, in order to reduce the build time, and/or in order to ease the process of removing the support structures 58, 60 from the component being built (i.e., airfoil 36). Similarly, it may be necessary to build portions of the support structures 58, 60 thicker than other portions in order to provide the necessary structural robustness.

Figure 5:
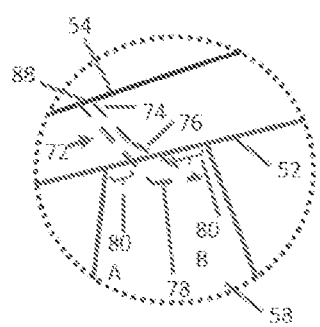
FIG. 5 is an enlarged view of a portion of the airfoil of FIG. 4.

FIG. 5 is an enlarged view of the portion of the airfoil 36 highlighted in area B in FIG. 4. FIG. 5 illustrates the airfoil 36 while it is being built including a film cooling hole 72 which includes a metering portion 74 and a diffuser portion 76. The film cooling hole 72 emerges from the large cooling passage 54. In operation within an airfoil 36, cooling air flows through the metering portion 74 which helps to regulate the mass flow rate of cooling air through the film cooling hole 72. Cooling air then flows into the diffuser portion 76 which serves to spread the cooling air out prior to the cooling air exiting the film cooling hole 72. Next, after exiting the diffuser portion 76, the cooling air spreads out across the outer periphery or surface of the airfoil 36, thereby creating an insulating air buffer between the hot gas path temperatures and the airfoil 36. However, FIG. 5 illustrates a build process step of airfoil 36 in which the first support structure 58 is still attached to the airfoil 36 during this phase of the build process and cooling air would not be flowing through the film cooling hole 72.

In FIG. 5, the film cooling hole geometry is partially inside the first support structure 58 and partially inside the airfoil 36. For example, the entire metering section 74 is located in the airfoil 36 but a first upstream portion of the diffuser section 76 is located in the airfoil 36 and a second downstream portion of the diffuser (i.e., downstream from the upstream portion of the diffuser) is located in the first support structure 58. In operation, cooling air enters the film cooling hole 72 at a cooling hole inlet 88, which fluidly connects the large cooling passage 54 to the film cooling hole 72. A cooling hole exit 78 is disposed at the downstream end of the film cooling hole 72 and, in operation, fluidly couples the film cooling hole 72 to the exterior of the airfoil 36.

Still referring to FIG. 5, the geometry of the film cooling hole 72 is formed during the build process via additive manufacturing. As such, the geometry of the film cooling hole 72, at the stage of the build process shown in FIG. 5, is entirely internal to the airfoil 36 and first support structure 58. In contrast, with airfoils and components manufactured via conventional processes, the film cooling hole 72 may need to be drilled into the airfoil 36 after the airfoil is formed via, for example, investment casting, in which case the drill enters the airfoil externally and the film cooling hole 72 is open and fluidly connected to the exterior of the airfoil 36. FIG. 5 also illustrates a first substrate portion 80A and a second substrate portion 80B that are both disposed at the interface between the first support structure 58 and the airfoil suction side 52. According to aspects of the present embodiments, the first support structure 58 and the airfoil 36 with which it interfaces at the suction side 58 may be formed as a unitary structure rather than as two interfacing structures. As such, the first substrate portion 80A and the second substrate portion 80B illustrated in FIG. 5 may or may not be present as a physical wall or equivalent structure defining the boundary between the first support structure 58 and the airfoil 36. Instead, the airfoil 36 and first support structure 58 may be formed and/or blended as a unitary, monolithic structure during the build process. The embodiment of FIG. 5 has been described in terms of a first support structure 58 and an airfoil suction side 52. However, the description applies equally to other support structures, other component types and other component build locations.

Figure 6:
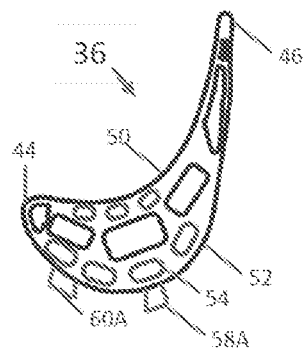
FIG. 6 is a radially-inward looking cross-section view of an airfoil following printing via additive manufacturing.

FIG. 6 illustrates a radially-inward looking cross-section view of an airfoil 36 following formation via additive manufacturing. The airfoil 36 extends from a leading edge 44 to a trailing edge 46, and from a pressure side 50 to a suction side 52. FIG. 6 illustrates the airfoil 36 after the first and second support structures (not shown) are removed to a height slightly greater than a desired coating thickness. Following the removal of the first and second support structures (not shown), a first pedestal 58A and a second pedestal 60A remain in place. The first and second support structures (not shown) may be removed via any suitable process. For example, the first and second support structures (not shown) may be mechanically broken off from or removed at first height, and then machined down to a second desired height. The embodiment of FIG. 6 does not illustrate the geometry of the film cooling hole 72 (not shown). However, the film cooling hole(s) 72 would still be present partially disposed within the airfoil 36 and partially disposed within the first pedestal 60A and/or the second pedestal 60B. In the embodiment of FIG. 6, the film cooling hole(s) 72 would still be "blanked," (i.e., entirely internal to the airfoil and pedestals).

Figure 7:
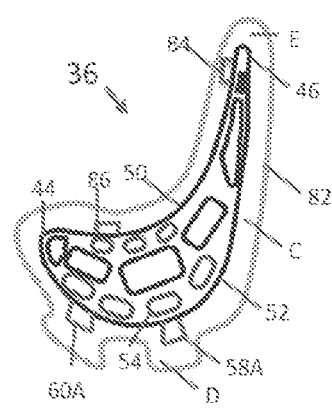
FIG. 7 is a radially-inward looking cross-section view of an airfoil following a coating process.

FIG. 7 illustrates a radially-inward looking cross-section view of an airfoil 36 following a coating process. The airfoil 36 extends from a leading edge 44 to a trailing edge 46, and from a pressure side 50 to a suction side 52. As illustrated in FIG. 7, a coating 82 is disposed around the entire exterior of the airfoil 36. The coating may be applied around the periphery of the airfoil 36 at an approximately constant thickness. For example, a first coating thickness C on the suction side may be approximately equal to both a second thickness D adjacent the first pedestal 58A as well as a third coating thickness E at the airfoil trailing edge 46. FIG. 7 also illustrates a third pedestal 84 disposed on the airfoil pressure side 50 proximate the trailing edge 46, as well as a fourth pedestal 86 disposed on the airfoil pressure side 50 in the vicinity of the airfoil leading edge 44. The third and fourth pedestals 84, 86 may be printed directly onto the airfoil as pedestals (i.e., rather than as support structures) since they are located on portions of the airfoil for which support structures would not be beneficial (given the orientation of the airfoil 36 during print in FIG. 7). The third and fourth pedestals 84, 86 would serve the purpose of blanking the film cooling holes 72 (i.e., covering the film cooling holes 72 so they are not exposed to the exterior of the airfoil 36) thereunder during the coating process ensuring that coating does not enter the film cooling holes 72 and protecting the internal geometry of the film cooling holes 72. The pedestals 58A, 60A, 84, 86 form a barrier between the film cooling hole 72 and the coating 82, thereby preventing coating 82 from being disposed within film cooling hole 72. The coating 82 of FIG. 7 may be any thermal barrier coating (TBC), environmental barrier coating (EBD), bond coat, and/or other type of coating.

Figure 8:
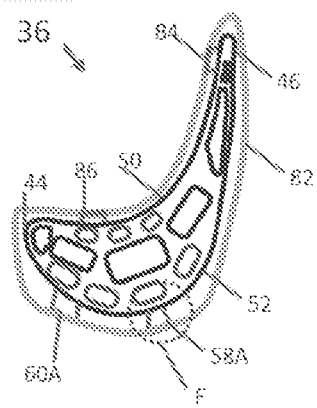
FIG. 8 is a radially-inward looking cross-section view of an airfoil following a blending process.

FIG. 8 illustrates a radially-inward looking cross-section view of an airfoil 36 following a blending process. The airfoil 36 extends from a leading edge 44 to a trailing edge 46, from a pressure side 50 to a suction side 52, and from a root portion 48 to a tip portion 42. As illustrated in FIG. 8, the surface of the airfoil 36 is blended to a desired aerodynamic airfoil profile. As compared to the airfoil profile of FIG. 7 in the vicinity of coating thickness D near the first pedestal 58A which protrudes from the airfoil suction side 52, the coating at the first pedestal 58A in FIG. 8 blends smoothly with the coating immediately forward and aft of the first pedestal 58A. After blending, the transition between the surface 52 of the airfoil 36 and the surface of the first pedestal 58A is smooth enough to include protrusions and other irregularities no greater than about 5 mils. In other embodiments, the transition between the surface 52 of the airfoil 36 and the surface of the first pedestal 58A is smooth enough to include protrusions and other irregularities no greater than about 3 mils. In other embodiments, the transition between the surface 52 of the airfoil 36 and the surface of the first pedestal 58A is smooth enough to include protrusions and other irregularities no greater than about 1 mil. Any blending process may be used to smooth the coating including grinding, scraping, smoothing, polishing, sanding, manual machining, milling, EDM, wire EDM, laser ablation, as well as other equivalent processes.

Figure 9:
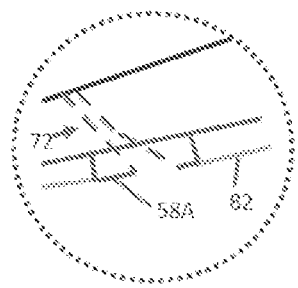
FIG. 9 is an enlarged view of a portion of FIG. 8.

FIG. 9 is an enlarged view of the portion in circle F of FIG. 8, illustrating a film cooling hole 72 exposed to the exterior of the airfoil 36, and retaining its as-printed sharp edges. The film cooling hole 72, as illustrated in FIG. 9, is no longer "blanked" and is open to the exterior of the airfoil 36, and therefore able to flow cooling air when in operation. In addition, the film cooling hole 72 provides a conduit between the interior and exterior of the airfoil 36. Therefore, the open film cooling hole 72 may be used as a conduit for removing powder (i.e., metallic, ceramic, and/or polymer powder that may have been used in the additive build process) from the interior of the airfoil. As illustrated in FIG. 9, the coating 82 blends smoothly with the first pedestal 58A, the outer portion of which does not have coating 82 disposed thereon. For multiple reasons, avoiding coating 82 within or near film cooling holes 72 may be desirable. Firstly, coating disposed within film cooling holes 72 may restrict the flow of cooling air through the holes thereby reducing the effectiveness of the associated film cooling. Secondly, reducing thermal gradients (i.e., temperature differences) within various portions of a component is associated with extending the life of the component. Therefore, where a portion of a component is film cooled, it may not also need to be coated because otherwise that portion would be cooler than surrounding portions which are coated but not film cooled. Finally, the process of removing or smoothing coating that has inadvertently or unevenly been disposed within the film cooling hole 72 has the potential to damage the geometry of the film cooling hole 72. By not having to perform cleaning operations, the risk of damaging the film cooling hole 72 is reduced and/or eliminated. The present claimed embodiments describe a process that eliminates both the need to drill cooling holes, as well as the need to remove coating from film cooling holes 72, while still allowing the cooling holes to include fine feature details that are enabled by an additive manufacturing build process, and lead to enhanced cooling effectiveness.

Figure 10:
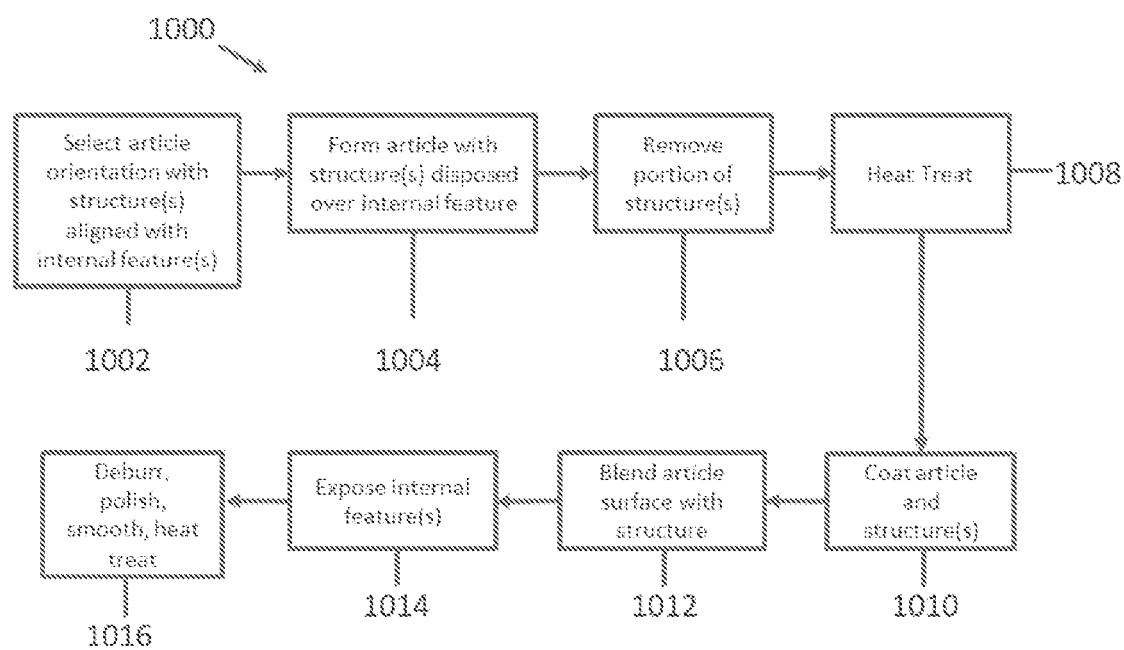
FIGS. 10-12 illustrate methods of forming an airfoil or component, according to aspects of the present disclosure.

FIG. 10 illustrates a method 1000 of forming an airfoil 36 or component according to the present embodiments. The method 1000 may be used to form airfoils and other components with detailed features. At step, 1002 the method 1000 includes choosing an orientation of the component such that structures which may include support structures 58, 60 (as well as pedestals 84, 86 and other structures) are aligned with internal features of the component during the build process. Support structures 58, 60 may be used to structurally support the component while it is being built and also to cover the internal feature, while pedestals 84, 86 are used only to cover the internal features. Structures with geometries other than support structures 58, 60 and pedestals 84, 86 may also be used in method 1000 and at step 1002. The component may include an airfoil 36 as well as other components as described above and below. Forming may include 3D-printing and/or additive manufacturing, but may also include other processes such as investment casting, forging, injection molding, rapid prototyping as well as others. The internal features may include film cooling holes 72, other types of cooling holes and features, as well as aerodynamic features such as dimples, grooves, bumps, trenches, flow conditioning structures, etc. The internal features may include passageways, cavities and/or channels used for purposes other than cooling.

Still referring to FIG. 10, the method 1000, at step 1004, includes forming the article or component with the structures disposed over the internal feature(s) (i.e., film cooling hole(s) 72) such that the internal feature(s) is not exposed to the exterior of the component (i.e., airfoil 36) after the initial forming process is complete. At step 1006, the method 1000 includes removing a portion of the structures. For example, portions of the support structures 58, 60 may be removed at step 1006, leaving being pedestals and/or structures with other geometries that still cover the internal features. The supports 58, 60 are removed via machining or other means to a height slightly greater than the desired coating thickness. For components that do not include support structures 58, 60, and instead include only pedestals 84, 86, step 1006 may not be needed. At step 1008, the method 1000 includes heat treating the component. At step 1010, the method 1000 includes coating the article or component (i.e., airfoil 36). The coating may include thermal barrier coatings (TBC), environmental barrier coatings (EBC), bond coats, cladding and other types of coatings. The coating is applied around the entire exterior of the article (i.e., airfoil 36) with an approximately constant thickness. The coating thickness may be from about 0 to about 200 thousandths of an inch (i.e. mils), or from about 5 mils to about 100 mils, or from about 10 mils to about 80 mils, or from about 20 mils to about 60 mils, or from about 30 mils to about 50 mils, as well as other subranges therebetween. At step 1012, the method 1000 includes blending the coating dispose around the surface of the article or component (i.e., airfoil 36), with the structure (i.e., the remaining portions of the support structures 58A, 60A, and/or the pedestals 84, 86). The coating is blended to the correct profile, including the removal of the portion of the support blanking the film cooling holes 72. Stated otherwise, after step 1012, the exterior of the article has a form factor or profile matching the article without coating and without pedestals 84, 86 and/or the remaining portions of the support structures 58A, 60A. As such, following step 1012, the coating disposed on the pedestals 84, 86 and/or on the remaining portions of the support structures 58A, 60A will likely be thinner than the coating disposed on other surfaces or areas of the article or component. The coating may be completely removed from the pedestals 84, 86 and/or the remaining portions of the support structures 58A, 60A following step 1012. Blending may include any blending process to smooth the coating including grinding, scraping, smoothing, polishing, sanding, manual machining, milling, EDM, wire EDM, laser ablation, as well as other processes.

Still referring to FIG. 10, at step 1014, the method 1000 includes exposing the internal features (i.e., film cooling holes(s) 72) if they are not exposed already, such that the interior of the airfoil 36 is now in fluid communication with the exterior of the airfoil 36, via the film cooling hole 72. The film cooling hole 72 retains the original feature details and sharp edges from the additive manufacturing process, undisturbed by the coating process and/or an external drilling process that would have been used to form the film cooling holes in legacy systems. At step 1016, the method 1000 may include post-processing steps such as smoothing, deburring, polishing, heat treating, sintering, machining, coating, and/or other processes.

Figure 11:
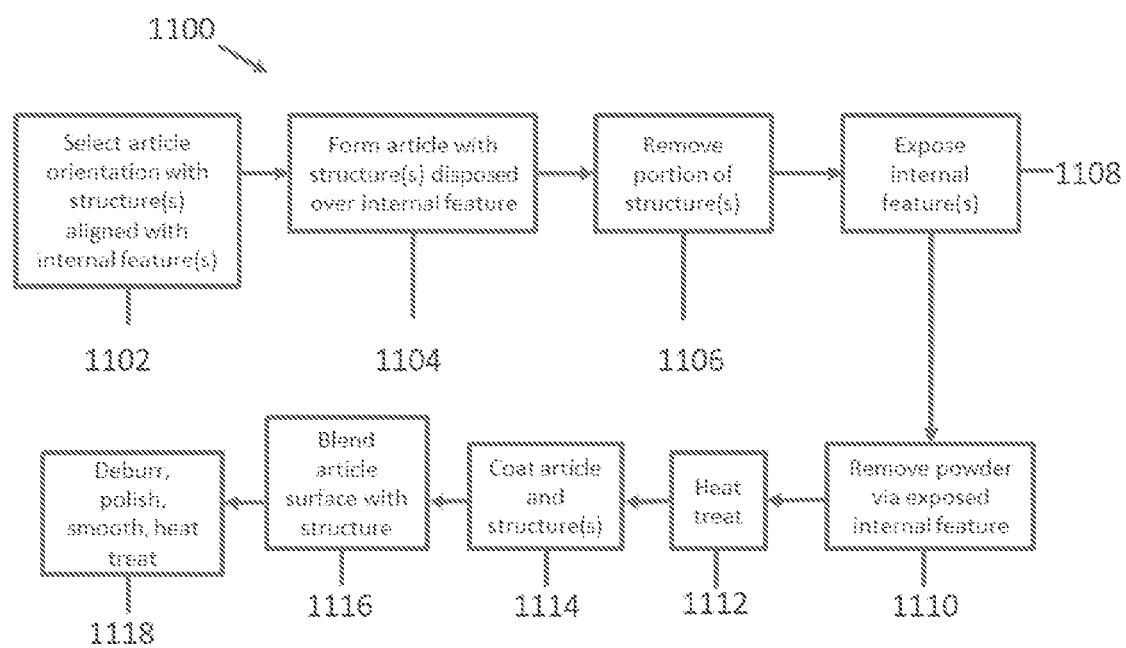

FIG. 11 illustrates a method 1100 of forming an airfoil 36 or other component according to the present embodiments. The embodiment of FIG. 11 includes many of the same steps as the embodiment of FIG. 10. For example, steps 1002, 1004, and 1006 of method 1000 are the same as steps 1102, 1104, and 1106 of method 1100. In the embodiment of FIG. 11, at step 1108, the internal features of the component are exposed. At step 1110, the method 1100 may include removing any excess powder (i.e., metallic, ceramic, and/or polymer powder used in an additive manufacturing build process) that may have accumulated in the interior of the component (or airfoil 36) during the build processes. The powder may be removed via the exposed film cooling hole(s) 72 or via other passageways. At step 1112, the method 1100 includes heat treating the component. At steps 1114, 1116, and 1118, the method 1100 includes coating, blending and post-processing steps similar to steps 1010, 1012, and 1016 of method 1000.

Figure 12:
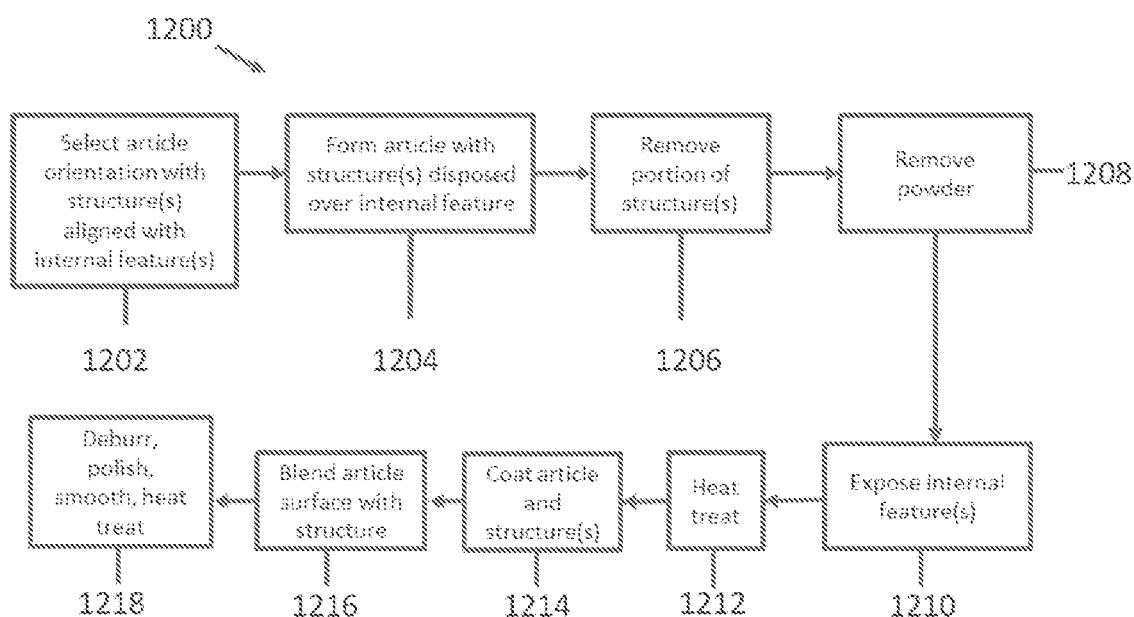

FIG. 12 illustrates a method 1200 of forming an airfoil 36 or other component according to the present embodiments. The embodiment of FIG. 12 includes many of the same steps as the embodiments of FIGS. 10 and 11. In the embodiment of FIG. 12, at step 1208 the method 1200 includes removing powder from the interior of the airfoil 36 or component. The removal of powder may occur via one or more internal passages (for example at least one of passages 54, 56, 64, 66, 68, and 70 shown in FIG. 3, etc). At step 1210, the method 1200 includes exposing the internal features. At step 1212, the method 1200 includes heat treating the component. At steps 1214, 1216, and 1218, the method 1200 includes coating, blending and post-processing steps similar to steps 1010, 1012, and 1016 of method 1000. Each of the methods 1000, 1100, and 1200 illustrated in FIGS. 10-12 may include two heat treat processes, a first heat treat process prior to coating and a second post-processing heat treat. In each of the methods 1000, 1100, and 1200 illustrated in FIGS. 10-12, the steps may be performed in a different order than those shown, and in some embodiments, not all steps and/or sub-steps may be performed. Each of the methods 1000, 1100, and 1200 illustrated in FIGS. 10-12 may include other steps (i.e., other than those shown).

By placing the support structures 58, 60 so as to abut, cover and/or overlap with various features of the cooling design, film cooling holes 72 and/or other thermal management features, machining that would be required for placement of film holes is no longer required, and is replaced by the simpler step of support structure removal. Additionally, when the film shapes are completely or partially formed via an additive manufacturing printing process, they may be protected during coating. This allows the creation of sharper film hole features which may provide 20-50% cooling benefit over shapes which have been coated over. Alternately, the film cooling holes 72 may be enclosed entirely within the airfoil wall 52, 50. In contrast, using legacy processes, removal of the support structures 58, 60 and/or pedestals 84, 86 reveals and/or exposes the film cooling holes 72 when blended to the airfoil profile. With legacy processes, the airfoil is then coated and the holes are coated over, requiring a separate cleaning operation or a design of the shape to account for coating in-fill. The present embodiments replace and/or reduces expensive film hole machining operations, as well as post-coating film cooling hole 72 cleaning operations.

The pedestals 84, 86 of the present embodiments may not contain the film shapes, but only some portion of the film cooling hole 72. This allows the connection of the cooling passage either before or after coating via conventional machining processes. Blending the coating may still allow the retention of sharp film edges. Alternately, the film pedestals 84, 86 may also be constructed for film rows not in direct contact with additive supports 58, 60. The pedestals 84, 86 could be printed open or closed, depending on preference for exposing the hole 72 via post-coat blending, using a post-coat cleaning operation on open holes, or using a separate masking process prior to coating such that the sharp definition of the holes is retained.

Enhanced printing of airfoils 36 and other components (such as turbine nozzles, turbine vanes, shrouds, struts, combustor lines, fuel nozzles, other gas turbine components as well as parts, assemblies, and components of other articles of manufacture) requires provisions for supporting the weight of over-hanging surfaces, including the airfoil flow-path surfaces. The embodiments presented herein provide a method for incorporating film cooling channels and/or holes into supports in order to reduce the number of operations required to produce a finished part. Supports are aligned with desired film locations. The supports may contain at least a portion of the film geometry, which are protected during coating. When the airfoil surface is blended to the target profile, the film shapes are revealed and no further machining or cleaning is required. In another embodiment, the shapes are exposed when supports are removed or drilled into pedestals using conventional methods prior to coating. These pedestals may be masked during coating and later exposed.

Reducing film machining operations may reduce the cost of an airfoil component by up to ⅓. Sharp edged film holes perform 20-50% better than holes with coating effects. Reduced film cooling flow could accordingly improve combined cycle efficiency. Printed film holes allow the incorporation of new film shapes that have 50-100% better performance than conventionally machined shapes without associated cost increases from difficult to machine features. Advanced shapes could provide better uniformity reducing spall risk and improving part life post spall. The embodiments presented herein have been primarily described in terms of airfoils. However, the methods, components, and systems presented herein may apply equally to other components with internal and/or near-surface detailed features that are capable of being printed rather than drilled or cast, and for which it is desired that exposure to a coating process (or other post-printing process) be limited. Such components may include combustor liners, turbine nozzles and/or turbine vanes, turbine blades, turbine shrouds, struts, disks, and other components in the hot section of a gas turbine, elsewhere in a gas turbine as well as parts and components of other articles of manufacture. Airfoils may include rotating turbine blades, rotating compressor blades, rotating fan blades, stationary turbine nozzles, struts, stationary compressor vanes, modulating inlet guide vanes, and other types of airfoils. A root portion of a stationary turbine nozzle or vane may correspond to the radially inner portion of the airfoil adjacent a flow path inner band while a tip portion of a stationary turbine nozzle or vane may correspond to the radially outer portion of the airfoil adjacent a flow path outer band.

While only certain features of the invention have been illustrated and described herein, many modifications and changes will occur to those skilled in the art. It is, therefore, to be understood that the appended claims are intended to cover all such modifications and changes as fall within the true spirit of the present embodiments.

This written description uses examples to disclose the present embodiments, including the best mode, and also to enable any person skilled in the art to practice the present embodiments, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. An article of manufacture comprising:
   an article body portion;
   at least one pedestal integrally formed by additive manufacturing with the article body portion, the at least one pedestal disposed at an outer periphery of the article body portion, and structurally coupled to the article body portion;
   at least one internal feature, the at least one internal feature disposed at least partially within the article body portion and at least partially within the at least one pedestal; and
   a coating disposed on the article body portion and the at least one pedestal;
   wherein at least a portion of the at least one internal feature is hollow, and
   wherein the at least one pedestal forms a barrier between the at least one internal feature and the coating preventing access to the at least one internal feature, thereby preventing the coating from being disposed within the at least one hollow portion of the at least on internal feature.

2. The article of claim 1, wherein the at least one pedestal is oriented relative to an additive manufacturing build direction such that the at least one pedestal comprises a support structure to the article body portion.

3. An article comprising:
   an airfoil body, the airfoil body extending from a leading edge to a trailing edge, the airfoil body extending from a pressure side to a suction side, the airfoil body extending from a root portion to a tip portion;
   at least one internal cavity disposed within the airfoil body;
   at least one pedestal integrally formed by additive manufacturing with the airfoil body, the at least one pedestal protruding from an outer periphery of the airfoil body, the at least one pedestal structurally coupled to the airfoil body; and at least one film cooling hole, the at least one film cooling hole disposed at least partially within the airfoil body and at least partially within the at least one pedestal, wherein the at least one pedestal is configured to prevent access to the at least one internal cavity, wherein the at least one film cooling hole is in fluid communication with the at least one internal cavity.

4. The article of claim 3, the at least one film cooling hole further comprising:
   a metering section fluidly connected to the at least one internal cavity; and
   a diffusing section fluidly connected to the metering section, the diffusing section comprising:
   a first upstream portion disposed within the airfoil body; and
   a second downstream portion downstream from the first upstream portion, the second downstream portion disposed within the at least one pedestal.

5. The article of claim 3, wherein the at least one pedestal is integrally formed with the suction side of the airfoil.

6. The article of claim 3, further comprising a coating disposed on the airfoil body and the at least one pedestal, wherein the thickness of the coating is between about 0 mils and about 200 mils.

7. The article of claim 6, wherein the coating disposed on the airfoil body is blended with the coating disposed on the at least one pedestal such that a transition between a surface of the airfoil and a surface of the at least one pedestal is smooth enough to include protrusions and other irregularities no greater than about 5 mils.

8. The article of claim 7, the at least one film cooling hole further comprising:
   a metering section fluidly connected to the at least one internal cavity; and
   a diffusing section fluidly connected to the metering section, the diffusing section comprising:
   a first upstream portion disposed within the airfoil body; and
   a second downstream portion downstream from the first upstream portion, the second downstream portion disposed within the at least one pedestal,
   wherein the at least one pedestal is integrally formed with the section side of the airfoil.

9. A method of forming a component comprising:
   selecting an orientation for the component being formed such that one or more structure aligns with at least one feature of the component;
   forming the component and the one or more structure by additive manufacturing with the one or more structure disposed on the at least one feature;
   coating the component and the one or more structure; and
   blending at least one surface of the component with at least one surface of the one or more structure;
   wherein the at least one feature is disposed at least partially in the component and at least partially in the one of more structure, wherein the at least one structure is configured to prevent access to the at least one feature of the component.

10. The method of claim 9, further comprising:
    selecting an orientation of the one or more structure relative to an additive manufacturing build direction such that the one or more structure acts as a support structure to the component during forming,
    wherein forming the component and the one or more structure further comprises forming the one or more structure before forming the component.

11. The method of claim 10, further comprising:
    removing at least a portion of the one or more structure prior to coating the component;
    exposing the at least one feature such that the at least one feature is exposed to the exterior of the component;
    removing powder from the component via the at least one feature following exposing the at least one feature; and
    at least one of deburring the component, polishing the component, smoothing the component, and heat-treating the component,
    wherein the one or more structure further comprises at least one support structure used to support the component during forming, and
    wherein the at least one feature further comprises at least one film cooling hole.

12. The method of claim 9, further comprising removing at least a portion of the one or more structure prior to coating the component.

13. The method of claim 9, wherein the one or more structure further comprises at least one support structure used to support the component during forming.

14. The method of claim 9, wherein the at least one feature further comprises at least one film cooling hole.

15. The method of claim 9, further comprising exposing the at least one feature prior to coating such that the at least one feature is exposed to the exterior of the component.

16. The method of claim 9, further comprising removing powder from the component via the at least one feature prior to coating the component.

17. The method of claim 9, further comprising:
    heat treating the component prior to coating the component; and
    heat treating the component following blending at least one surface of the component.

* * * * *